United States Patent Office 3,718,214
Patented Feb. 27, 1973

3,718,214
CENTRIFUGAL CLUTCH
Albert K. Newman, Noroton, Conn., assignor to
Textron Inc., Providence, R.I.
Filed May 4, 1971, Ser. No. 140,079
Int. Cl. F16d 7/30
U.S. Cl. 192—105 CD                                        7 Claims

ABSTRACT OF THE DISCLOSURE

A centrifugal clutch has a soft steel low carbon drum and a one-piece cast rotor comprising an iron bar portion with a central hub portion, two segment shaped weight portions each having a circumferential extent of at least 90° and a radial extent of at least 25% of the overall diameter of the rotor and integral thin spring portion connecting opposite ends of the cross bar with the weight portions respectively, each spring portion extending a circumferential extent of the order of 30° to 50° and spaced radially inwardly out of engagement with the drum. The weight portions have centrifugal forces which engage the drum when the rotor is rotated at or above a critical speed to drive the drum.

---

The present invention relates to a centrifugal clutch for providing a driving connection between a rotary driving member and a rotary driven member when the driving member rotates at or above a critical speed.

Centrifugal clutches are widely used in power tools and other equipment driven by internal combustion or other engines. For example, as applied to a chain saw, a centrifugal clutch is provided between the engine and a sprocket driving the saw chain. When the engine is running at idling speed, the clutch is disengaged so that the chain is not driven. When the engine is accelerated to a predetermined speed, the clutch engages to drive the saw chain. This provides a convenient control of the chain and also is a safety factor in that the chain is not driven when the engine is started and is idling. Moreover, it reduces the starting torque or the engine.

A centrifugal clutch normally involves an outer drum and a rotor inside the drum. The rotor constitutes the driving member of the clutch while the drum is the driven member. The rotor usually comprises a hub or body portion, at least two weights separate from and movably mounted on the body portion and one or more springs for holding the weights out of engagement with the drum when the rotor is stationary or is rotating at a speed below a selected critical speed. When the critical speed is reached or exceeded, the weights move outwardly against the action of the spring means so as to engage the drum and thereby provide a driving connection between the drum and rotor. The manufacture and assembly of the parts comprising the rotor involves a considerable amount of expense. By reason of unavoidable manufacturing tolerances in the production of rotor parts, it is difficult in commercial production to manufacture clutches of consistently uniform operating characteristics. Moreover, the operating characteristics of an individual clutch may change in use, for example by reason of dirt entering between the moving parts of the clutch rotor.

It is an object of the present invention to provide a centrifugal clutch which is highly reliable and uniform in operation and yet is of simple and economical construction.

In accordance with the invention, the rotor of a centrifugal clutch is of one-piece construction consisting of a single casting requiring only a minimum amount of finishing in its operation. By reason of the simplicity of its construction, the clutch can be manufactured economically. Moreover, the simplicity of design and freedom from sliding or pivoting parts contribute to the reliability and uniformity of operation of the clutch.

The nature and advantages of the invention will be more fully understood from the following description of a preferred embodiment shown by way of example in the drawings in which.

Figure 3:
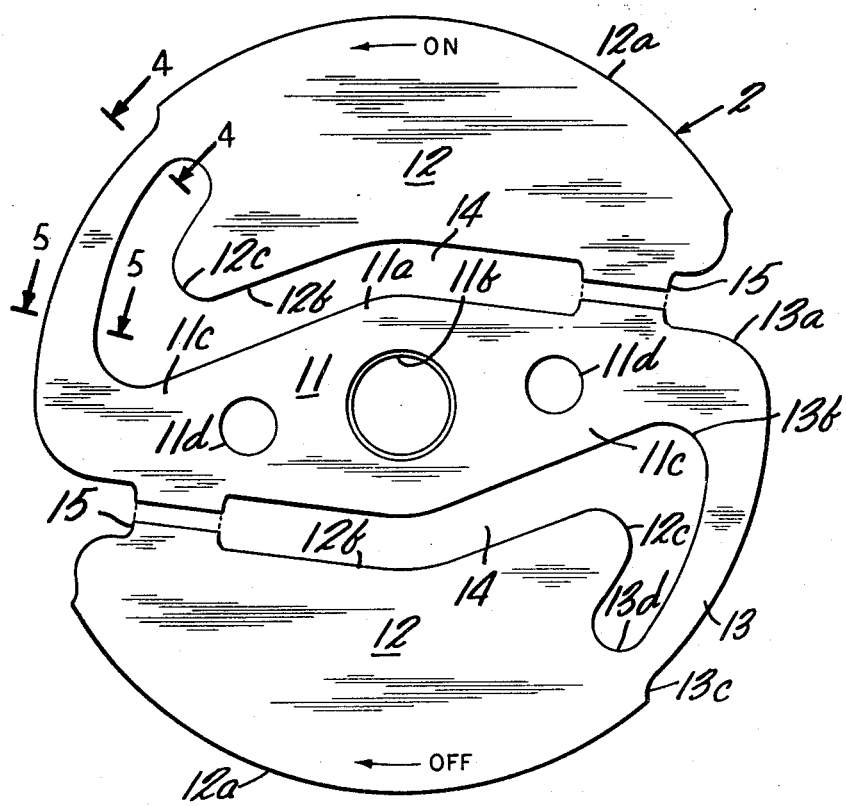
FIG. 3 is an enlarged end view of the clutch rotor.
Figure 4:
Figure 5:

FIGS. 4 and 5 are sections taken respectively on the lines 4—4 and 5—5 in FIG. 3.

Figure 1:
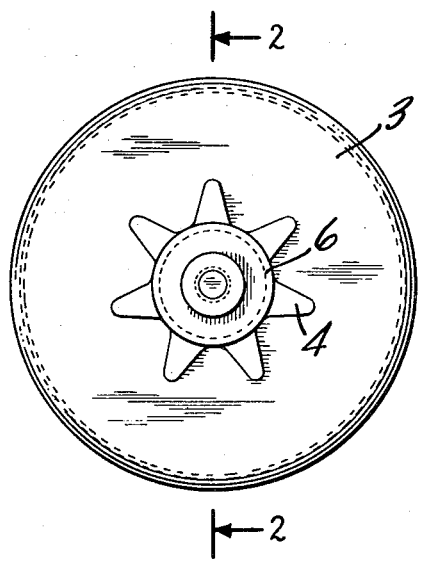
FIG. 1 is an outer end view of a clutch assembly in accordance with the invention.
Figure 2:
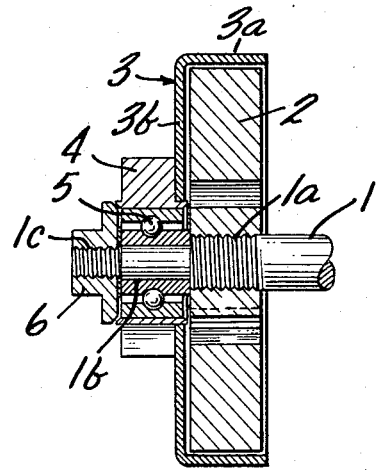
FIG. 2 is a cross section taken approximately on the line 2—2 in FIG. 1.

FIGS. 1 and 2 show by way of example a centrifugal clutch assembly for a chain saw. A central shaft 1 is driven by the engine of the chain saw, for example by being an extension of the engine crankshaft or by being coupled or connected to the engine crankshaft for example by suitable coupling means or by gearing. The shaft 1 is shown as having a threaded portion 1a, a cylindrical portion 1b and a reduced threaded end portion 1c. A rotor 2 is mounted on the shaft 1 so as to rotate therewith, for example by being screwed onto the threaded portion 1a as will be described more fully below. An assembly comprising a drum 3 and a sprocket 4 is rotatably mounted on the cylindrical portion 1b of the shaft by means of a ball bearing 5. The sprocket 4 is designed to engage and drive the chain of the chain saw. The drum-sprocket assembly is retained on the shaft 1 by a nut 6 screwed onto the reduced end portion 1c of the shaft.

The drum 3 comprises a cylindrical circumferential portion 3a extending axially from a radial portion 3b. The drum is conveniently made from low carbon soft steel sheet metal by a stamping or drawing operation, using suitable dies. A drum having satisfactory manufacturing tolerances can be produced in this manner at low cost. The sprocket 4 is fixed to the drum, for example by welding, so as to be coaxial with the drum and to rotate therewith. The drum 3 is rotatably supported on the shaft 1 by the ball bearing 5 between the sprocket 4 and the shaft.

The rotor 2, as seen in cross section in FIG. 2 and in end elevation on a larger scale in FIG. 3, is of one-piece construction comprising a crossbar portion 11, two opposite weight portions 12 and spring portions 13 connecting opposite ends of the crossbar portion with the respective weight portions.

The crossbar portion 11 comprises a central hub portion 11a having a central bore 11b which is internally threaded so as to screw on the threaded portion 1a of the shaft 1 as seen in FIG. 2. Tapered arm portions 11c extend diametrically in opposite directions from the hub portion 11a. As seen in FIG. 3, the crossbar portion 11 is generally of diamond shape. Wrench holes 11d are provided in the opposite arm portions 11c to facilitate screwing the rotor onto and off of the shaft 1.

The two weight portions 12 are of identical configuration. Each is generally segmental in shape as seen in FIG. 3 with an arcuate circumferential surface 12a and a radially inner surface 12b. The inner surface 12b is of shallow V-shape so as to be spaced substantially equidistantly from the adjacent sides of the crossbar portion 11. The circumferential extent of the outer circumferential surface 12a is at least 90° and in the embodiment shown in FIG. 3, is approximately 100°. The overall circumferential extent of the weight portion may be somewhat greater and is shown by way of example in FIG. 3 as being approximately 130°. As seen in FIG. 3, the two weight portions are disposed on opposite sides of the crossbar 11 and are symmetrical thereto except that one weight portion is reversed with respect to the other. The centers of gravity of the weight portions are disposed on a line which is approximately perpendicular to the length of the crossbar portion 11.

The weight portions 12 are connected respectively with opposite ends of the crossbar portion 11 by integral spring portions 13. It will be seen that each of the spring portions 13 is joined with the respective end of the crossbar portion 11 by a portion defined by an outer curved surface 13a and an inner curved surface 13b so that the spring portion constitutes in effect a curved extension of the crossbar portion and sharp corners or angles are avoided. Likewise, the opposite end of each spring portion 13 is joined with the respective weight portion 12 by curves 13c and 13d. The spring portions 13 extend in a generally circumferential direction but with an outside radius somewhat less than that of the circumferential surfaces 12a of the weight portions 12 so that the spring portions 13 never come into engagement with the circumferential portion 3a of the drum 3. As seen in FIG. 3, the spring portions 13 taper in a circumferential direction so as to have a greater thickness in a radial direction adjacent the crossbar 11 than adjacent the respective weight portion 12. Moreover, as seen in FIGS. 4 and 5 the spring portions 13 taper in an axial direction. A lobe portion 12c of the weight portion 12 overlaps and is spaced radially inwardly of an adjacent portion of the respective spring portion 13. By reason of this configuration, the spaces 14 between the crossbar portion 11, weight portions 12 and spring portions 13 are somewhat J-shaped as seen in FIG. 3. The spaces are of approximately uniform width except for being somewhat wider at the curve of the J.

The crossbar portion 11, weight portions 12 and integral spring portions 13 are all preferably of substantially the same thickness in an axial direction so that the rotor except for the holes 11b and 11d and the spaces 14 is generally cylindrical and somewhat the shape of a hockey puck.

The rotor is conveniently manufactured as a single casting comprising the crossbar portions, weight portions 12 and connecting spring portions 13. When the rotor is cast, the end of each weight portion 12 opposite the connecting spring portion 13 is joined with the adjacent portion of the crossbar portion 11 by a connecting portion 15 of sufficiently large cross section to permit easy flow of the metal being cast. The spaces 14, except for the connecting portions 15, are provided in the mold by suitable mold configuration or coring. The central bore 11b and holes 11d may, if desired, be formed in like manner. After the rotor has been cast, the central bore 11b is tapped or otherwise finished to fit onto the shaft 1. The wrench holes 11d are drilled if they have not already been formed in the casing operation. The circumferential surfaces 12a are finished concentric with the bore 11b by a suitable machining or grinding operation. The remaining surfaces of the rotor require no machining or finishing operation and are left "as cast." After the surfaces 12a have been finished and the rotor has been suitably heat treated, the connecting portions 15 are severed, for example by saw cuts or grinding so as to free the leading ends of the weight portions 12 from the crossbar portion 11.

The material of the rotor is a ductile iron alloy having an ultimate strength of the order of 130,000 p.s.i. and a modulus of elasticity of the order of 20 million p.s.i. After casting, the rotor is heat treated to provide a Rockwell hardness of 30 to 40 and preferably 30 to 35 on the C scale. A material suitable for the rotor is an alloy made by Standard Automotive Parts of Muskegon, Mich. which is designated SAE J434A Class DQ & T and has approximately the following composition:

| | Percent |
|---|---|
| Total carbon | 3.1–3.7 |
| Silicon | 2.2–2.6 |
| Manganese | .6–.9 |
| Moly | .15–.35 |
| Nickel | .7–1.0 |
| Remainder iron. | |

The material has a density approximately equal to that of cast iron. Moreover, the material is compatible with the soft steel low carbon drum so that it engages the drum smoothly without chattering or galling.

As seen in FIG. 2, the rotor 2 has a circumferential extent approximately equal to that of the interior of the drum 3 so that it substantially fills the drum. The radius of the rotor is such that when the clutch is stationary the circumferential surfaces 12a of the rotor do not engage the circumferential portion 3a of the drum. The term "engage" is herein used to designate engagement with sufficient pressure to produce a' driving force between the rotor and drum and hence disengagement of the rotor from the drum does not necessarily require complete absence of contact. When the shaft 1, and hence the rotor 2, are driven at the normal idling speed of the engine, there is no driving contact between the rotor and the drum. When the engine is accelerated to a selected speed, for example 3,500 r.p.m. plus or minus 200 r.p.m., the weight portions 12 of the rotor move outwardly against the resilient restraint of the spring portions 13 so as to engage the drum and cause the drum to rotate with the rotor thereby driving the sprocket 4 and hence the saw chain which runs on the sprocket. The characteristics of the clutch are such that it engages substantially uniformly at a predetermined critical speed. Moreover, since the rotor does not involve any sliding or pivoted parts, the clutch continues to operate reliably and uniformly throughout its useful life.

Thus, the clutch in accordance with the present invention has excellent operating characteristics while being economical to manufacture and easy to install.

What I claim is:

1. A centrifugal clutch comprising a drawn soft steel low carbon drum and a generally circular one-piece cast rotor disposed coaxially in said drum, said rotor being of material having a modulus of elasticity of the order of 20,000,000, a tensile strength of the order of 130,000 p.s.i., a Rockwell C hardness of the order of 30–40 and a density approximately equal to that of cast iron, and comprising a diametrically extending crossbar portion having a hub portion with a central bore, two like weight portions on opposite sides respectively of said crossbar portions, each of said weight portions being generally of the shape of a segment of a circle with a circumferential extent of at least 90° and a radial extent of at least 25% of the overall diameter of said rotor, and integrally thin spring portions connecting opposite ends of said crossbar portion with said weight portions respectively, each said spring portion extending generally circumferentially of said rotor with a circumferential extent of the order of 30° to 50° and spaced radially inwardly out of engagement with said drum, said weight portions having arcuate circumferential surfaces engageable with said drum; said spring portions positioning said weight portions out of driving engagement with said drum in static condition and being flexible to permit driving engagement of said weight portions with said drum throughout substantially the entire said arcuate circumferential surfaces thereof at a selected speed of rotation.

2. A centrifugal clutch according to claim 1, in which each said weight portion has an end portion disposed radially between said spring portion and said crossbar portion.

3. A centrifugal clutch according to claim 1, in which all surfaces of said rotor are as cast except said central bore and said arcuate circumferential surfaces of said weight portion which are finished.

4. A centrifugal clutch according to claim 1, in which end portions of said weight portions opposite from said spring portions are initially integrally connected with adjacent portions of said crossbar by local connecting portions said local connecting portions being subsequently severed.

5. A centrifugal clutch according to claim 1, in which said crossbar portion is generally diamond shape when viewed in an axial direction, and in which each said weight portion has an angular radially inner surface generally conforming in shape to but spaced from said crossbar portion.

6. A centrifugal clutch comprising a drawn soft steel low carbon drum and a generally circular one-piece cast rotor disposed coaxially in said drum and comprising a diametrically extending crossbar portion having a hub portion with a central bore, two like weight portions on opposite sides respectively of said crossbar portions, each of said weight portions being generally of the shape of a segment of a circle with a circumferential extent of at least 90° and a radial extent of at least 25% of the overall diameter of said rotor, and integrally thin spring portions connecting opposite ends of said crossbar portion with said weight portions respectively, each said spring portion extending generally circumferentially of said rotor with a circumferential extent of the order of 30° to 50° and decreasing gradually in radial thickness from the end adjacent said crossbar toward the end adjacent said weight portion, said spring portions being spaced radially inwardly out of engagement with said drum, said weight portions having arcuate circumferential surfaces engageable with said drum; said spring portions positioning said weight portions out of driving engagement with said drum in static condition and being flexible to permit driving engagement of said weight portions with said drum throughout substantially the entire said arcuate circumferential surfaces thereof at a selected speed of rotation.

7. A centrifugal clutch comprising a drawn soft steel low carbon drum and a generally circular one-piece cast rotor disposed coaxially in said drum, said rotor being of material having a modulus of elasticity of the order of 20,000,000, a tensile strength of the order of 130,000 p.s.i., a Rockwell C hardness of the order of 30–40 and a density approximately equal to that of cast iron and having a composition consisting essentially of:

| | Percent |
|---|---|
| Carbon | 3.1–3.7 |
| Silicon | 2.2–2.6 |
| Manganese | 0.6–0.9 |
| Molybdenum | 0.15–0.35 |
| Nickel | 0.7–1.0 |

Remainder iron.

said rotor comprising a diametrically extending crossbar portion having a hub portion with a central bore, two like weight portions on opposite sides respectively of said crossbar portions, each of said weight portions being generally of the shape of a segment of a circle with a circumferential extent of at least 90° and a radial extent of at least 25% of the overall diameter of said rotor, and integrally thin spring portions connecting opposite ends of said crossbar portion with said weight portions respectively, each said spring portion extending generally circumferentially of said rotor with a circumferential extent of the order of 30° to 50° and spaced radially inwardly out of engagement with said drum, said weight portions having arcuate circumferential surfaces engageable with said drum; said spring portions positioning said weight portions out of driving engagement with said drum in static condition and being flexible to permit driving engagement of said weight portions with said drum throughout substantially the entire said arcuate circumferential surfaces thereof at a selected speed of rotation.

References Cited

UNITED STATES PATENTS 1,983,661    12/1934    Frantz et al. _____ 192—105 CD
3,367,463    2/1968    Armstrong _____ 192—105 CD CHARLES J. MYHRE, Primary Examiner R. HEALD, Assistant Examiner U.S. Cl. X.R.

64—27 S; 192—75, 103 B